United States Patent
Sulcer et al.

(10) Patent No.: US 11,237,705 B2
(45) Date of Patent: Feb. 1, 2022

(54) CONFIGURABLE USER INTERFACE INTERACTIONS USING A STATE MACHINE COMBINED WITH EVENT ORCHESTRATION

(71) Applicant: BMC Software, Inc., Houston, TX (US)

(72) Inventors: David T. Sulcer, Santa Clara, CA (US); Elaine Tang, Millbrae, CA (US); Dinesh Elaprolu, Fremont, CA (US)

(73) Assignee: BMC Software, Inc., Houston, TX (US)

( * ) Notice: Subject to any disclaimer, the term of this patent is extended or adjusted under 35 U.S.C. 154(b) by 415 days.

(21) Appl. No.: 13/835,739

(22) Filed: Mar. 15, 2013

(65) Prior Publication Data

US 2014/0281891 A1 Sep. 18, 2014

(51) Int. Cl.
*G06F 3/0484* (2013.01)

(52) U.S. Cl.
CPC .. *G06F 3/0484* (2013.01); *G06F 2203/04803* (2013.01)

(58) Field of Classification Search
CPC .............. G06F 3/0484; G06F 2203/04803
See application file for complete search history.

(56) References Cited

U.S. PATENT DOCUMENTS

| | | | | |
|---|---|---|---|---|
| 5,880,729 A * | 3/1999 | Johnston, Jr. | ........... | G06F 9/451 715/823 |
| 6,829,630 B1 * | 12/2004 | Pajak | .................. | H04L 41/0253 709/201 |
| 6,901,435 B1 * | 5/2005 | Sulcer | ..................... | H04L 67/36 707/999.003 |
| 6,989,820 B1 * | 1/2006 | Baker | ............... | H04M 1/72466 345/172 |
| 7,133,908 B1 * | 11/2006 | Pajak | .................. | H04L 41/0253 709/223 |
| 7,461,382 B2 * | 12/2008 | Hammerich | ............ | G06F 9/542 707/999.1 |
| 7,949,727 B2 * | 5/2011 | Jensen | ................ | H04L 12/2809 709/218 |

(Continued)

OTHER PUBLICATIONS

Template definition, Apr. 10, 2010, Merriam-Webster's English Dictionary, p. 1.*

(Continued)

*Primary Examiner* — Kavita Stanley
*Assistant Examiner* — Tyler Schallhorn
(74) *Attorney, Agent, or Firm* — Brake Hughes Bellermann LLP

(57) ABSTRACT

Disclosed is a method of displaying a user interface, the method includes defining a template for the user interface, the template including a plurality of display areas, defining a plurality of components, each of the components configured to perform an associated user interface function, each of the plurality of components being associated with one of the display areas, defining a plurality of states, each of the plurality of states including one or more of the plurality of components, each of the plurality of states defining a configuration of the user interface, defining a table, the table defining a plurality events associated with transitioning between states; and triggering a transition between states based on look-up of the table with a received event.

15 Claims, 8 Drawing Sheets

(56) References Cited

U.S. PATENT DOCUMENTS

| | | | | |
|---|---|---|---|---|
| 8,463,925 B1* | 6/2013 | Nath | | H04L 69/161 709/230 |
| 8,856,667 B2* | 10/2014 | Gaudette | | G06F 8/34 715/763 |
| 9,086,688 B2* | 7/2015 | Law | | G05B 9/02 |
| 10,274,926 B2* | 4/2019 | Law | | G05B 19/0426 |
| 10,824,443 B1* | 11/2020 | Rojas Fonseca | | G06F 9/3881 |
| 2003/0023439 A1* | 1/2003 | Ciurpita et al. | | 704/246 |
| 2004/0003355 A1* | 1/2004 | DenBraber | | G06F 17/5045 716/117 |
| 2006/0083357 A1* | 4/2006 | Howell | | H04M 3/4931 379/88.04 |
| 2006/0235548 A1* | 10/2006 | Gaudette | | G06F 8/34 700/83 |
| 2007/0198923 A1* | 8/2007 | Kodosky | | G06F 8/34 715/234 |
| 2008/0134018 A1* | 6/2008 | Kembel | | G06F 17/30899 715/234 |
| 2008/0263516 A1* | 10/2008 | Hartadinata | | G06F 8/34 717/109 |
| 2008/0270582 A1* | 10/2008 | Jensen | | H04L 12/2809 709/220 |
| 2008/0313260 A1* | 12/2008 | Sweet | | G06F 17/3089 709/201 |
| 2011/0099499 A1* | 4/2011 | Pnueli et al. | | 715/771 |
| 2011/0107294 A1* | 5/2011 | Ionfrida | | G06Q 30/02 717/101 |
| 2011/0270959 A1* | 11/2011 | Schlusser | | H04L 67/10 709/223 |
| 2013/0185632 A1* | 7/2013 | Damera-Venkata | | G06F 40/186 715/243 |
| 2013/0290925 A1* | 10/2013 | Shankar | | G06F 9/4496 717/105 |
| 2015/0018977 A1* | 1/2015 | Law | | G05B 19/0426 700/12 |
| 2015/0143260 A1* | 5/2015 | Bailey | | G06Q 50/01 715/753 |
| 2015/0277425 A1* | 10/2015 | Law | | G05B 19/0426 700/266 |

OTHER PUBLICATIONS

Mohan, Rakesh et al. "A State Machine Based Approach for a Process Driven Development of Web-Applications". May 29, 2002, Springer, Berlin, Heidelberg. <https://doi.org/10.1007/3-540-47961-9_7> (Year: 2002).*

* cited by examiner

| Component (445) | Published Event (450) (OUT) | Published Event Data (455) | Subscribed to Event (460) (IN) | Subscribed Event Data (465) |
|---|---|---|---|---|
| Navigator | ItemSelected | Item | NavDisplay | Bool |
| Diagram1 | NodeSelected | Item | | |
| Diagram1 | NodeDrillDown | ItemID | | |
| Diagram2 | NodeSelected | Cost | UnitSelected | Currency |
| Diagram2 | NodeDrillDown | CostID | | |
| Photo | | | DisplayRequest | PhotoID |

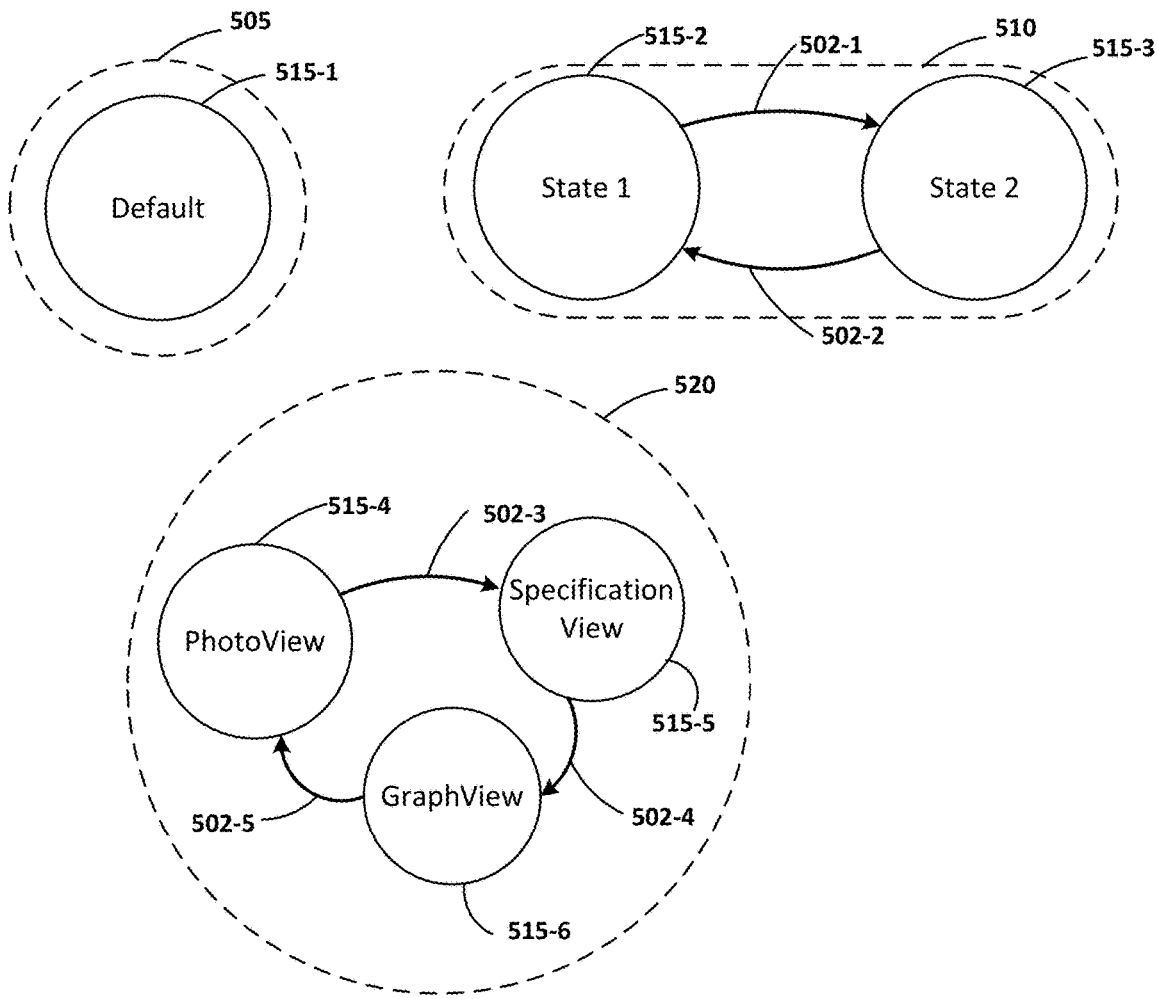

FIG. 5A

| Component (535) | Published Event (540) | Conditional Check (545) | Page State Change (550) | Component (552) | Subscribed to Event (555) | Event Data Transform (560) |
|---|---|---|---|---|---|---|
| Navigator | ItemSelected | Item=A | Dynamic.State 1 | | | |
| Navigator | ItemSelected | Item=B | Dynamic.State 2 | | | |
| Navigator | ItemSelected | Item=C | Dynamic.State1; Sidebar.PhotoView | | | |
| Diagram1 | NodeSelected | | Sidebar.PhotoView | Photo | DisplayRequest | Lookup(PhotoID) |
| Diagram1 | NodeDrillDown | | Sidebar. SpecificationView | Item | Specifications | Lookup(PhotoID) |
| Diagram2 | NodeSelected | | Sidebar.PhotoView | Photo | DisplayRequest | Lookup(PhotoID) |
| Diagram2 | NodeDrillDown | | Sidebar.GraphView | | SalesStats | Lookup(PhotoID) |
| Timer | Elapse | | | Navigator | NavDisplay | False |
| Area | Nav.Click | | | Navigator | NavDisplay | True |

FIG. 5B

CONFIGURABLE USER INTERFACE INTERACTIONS USING A STATE MACHINE COMBINED WITH EVENT ORCHESTRATION

FIELD

Embodiments relate to user interfaces as displayed on computer devices.

BACKGROUND

Software applications, especially those that solve complex problems for enterprises, must support a variety of user interactions by combining a relatively small set of visual components in different ways. These interactions can be created using "code" (procedural logic) by programmers. This requires experts in programming languages and techniques to create or customize these user interactions. Furthermore, when such interactions have been customized, there is an additional problem of merging such changes between the base version shipped as an upgrade from the software vendor, and the version modified by the customer.

However, in this specific area of user interface design and customization, declarative techniques have not been applied in this area at this level of granularity. To allow pre-defined enterprise user interface components to interact. Designers and user interface developers have been forced to fall back to standard coding techniques to create user interface experiences.

For example, if a customer wishes to extend a particular screen by integrating a new user interface component, and would like this user interface component only to appear under certain circumstances. Changing the design may not be attempted due to the complexity involved, because the existing components and the layout of the screen were designed using technology beyond the reach of the customer. Typically the most that can be easily done by the customer is to cause the new component to appear in a transitory "dialog box" adding a procedural statement such as, "show component in dialog now". This technically-oriented decision impacts usability of the product.

A related problem is the extra cost associated with the mingling of user interface layout logic, inter-component behavior, and component code. This lack of modularity impacts the re-usability of code, and causes other inefficiencies in the software development process because work cannot always be partitioned to the right professionals.

SUMMARY

One embodiment includes a method of displaying a user interface. The method includes generating a template for the user interface, the template including a plurality of display areas, defining a plurality of components, each of the components configured to perform an associated user interface function, each of the plurality of components being associated with one of the display areas, defining a plurality of states, each of the plurality of states including one or more of the plurality of components, each of the plurality of states defining a configuration of the user interface, generating a table, the table defining a plurality events associated with transitioning between states; and triggering a transition between states based on look-up of the table with a received event.

Another embodiment includes a server. The server includes at least one processor, and at least one memory. The at least one memory storing code segments that when executed by the processor cause the processor to receive a request for a web page, the web page including a user interface, determine a template for the user interface, generate a first state for the user interface based on the received request, generate the user interface based on the first state, and communicate a response to the request, the response including the web page, the user interface and other information configured to support the user interface.

Still another embodiment includes a client device. The client device including at least one processor, and at least one memory. The at least one memory storing code segments that when executed by the processor cause the processor to communicate a request for a web page, the web page including a user interface, receive a response to the request, the response including the web page, the user interface and other information configured to support the user interface, receive an event indication of a change from a first state to a second state, the first state and the second state indicating a variable configuration of the user interface, look-up the event indication in a table, transition from the first state to the second state based on the results of the event look-up, and refresh the web page based on the second state.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 5A and 5B illustrate user interface states and a table for configuring a user interface using the user interface states according to at least one example embodiment.

Figure 1:
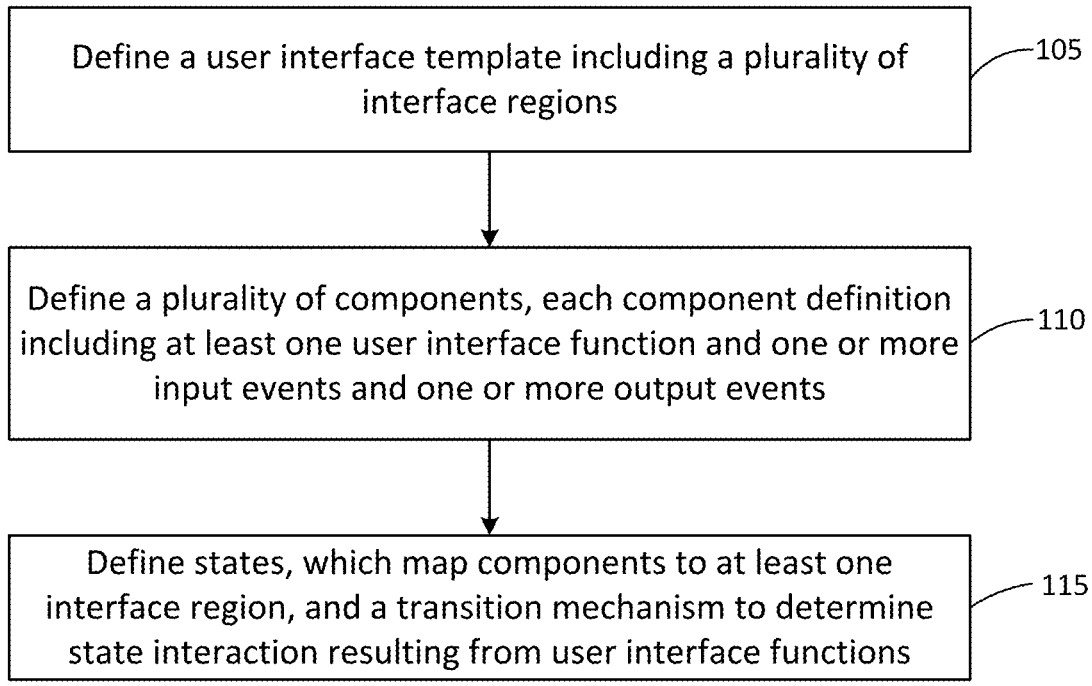
FIG. 1 illustrates a block diagram for generating a user interface according to one or more example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments provide techniques for constructing user interface experiences using modular coarse-grained building blocks, whose interactions may be declared as fine-grained configuration. This supports construction of built-to-purpose, dynamic user interface interactions that are also customizable and upgradable. Example embodiments allow separation of functionality and constructs aiding in efficiently building and maintaining modular and re-usable software.

Furthermore, using state machines for user interface may become very complex to manage by developers or leads to simplistic user interface patterns. Therefore, example embodiments provide a mechanism to map smaller, independent state machines to portions (e.g., areas or groups of areas) of a user interface page, which reduces the number of unique state permutations and makes it a feasible technique for sophisticated interactions. Hereinafter, state machines and state groups may be used interchangeably and may refer to a grouping of a set of states that reference a set of (one or more) user interface areas in order to reduce the number (e.g., simplify) the number of unique state permutations.

FIG. 1 illustrates a block diagram for generating a user interface according to one or more example embodiments. As shown in FIG. 1 a user interface template is defined (Block 105). The user interface template may include a plurality of interface areas (or regions). The plurality of interface areas may display static and/or dynamic user interface elements. For example, a static user interface element may not change over time. For example, a static user interface element may include a banner, a logo, and/or the like. A semi-static user interface element may change infrequently over time. For example, a semi-static user interface element may include a navigation bar (e.g., with a selection menu) and/or the like. For example, a dynamic user interface element may change frequently over time. For example, a dynamic user interface element may include a picture that changes based on a selection, a graph that changes based on selected data type, a selection tool that changes based on a piece of equipment, a table that changes based on selected data type, and/or the like. Although time is referenced, time is relative in that, according to example embodiments, time is based on a use time of the user interface.

A plurality of components is defined (Block 110). Each component definition may include at least one user interface function and may include at least one property and/or event. For example, as discussed above, the dynamic user interface element may include a picture that changes based on a selection. One of the components may be configured to display a picture. An associated property may be an identification number and/or a location of a stored picture. For example, the event may be "new picture selected" thus causing the displayed picture to change.

For example, the plurality of components may be associated with at least one state or state machine and a transition mechanism (between states) is defined (Block 115). The state may map components into user interface areas. The state machine (or state group) may manage a set of (e.g., one or more) interface areas. The transition mechanism may determine state interaction based on the events. The events may be based on user interface functions. For example, a table may be defined. The table may include a relationship between events, states and/or properties. A processor may be configured to receive an event, look-up the event in the table and transition the user interface from one state to another state, for one or more state machines, based on the look-up. The event may be based on, for example, a selection input on the user interface in a current state.

Figure 2:
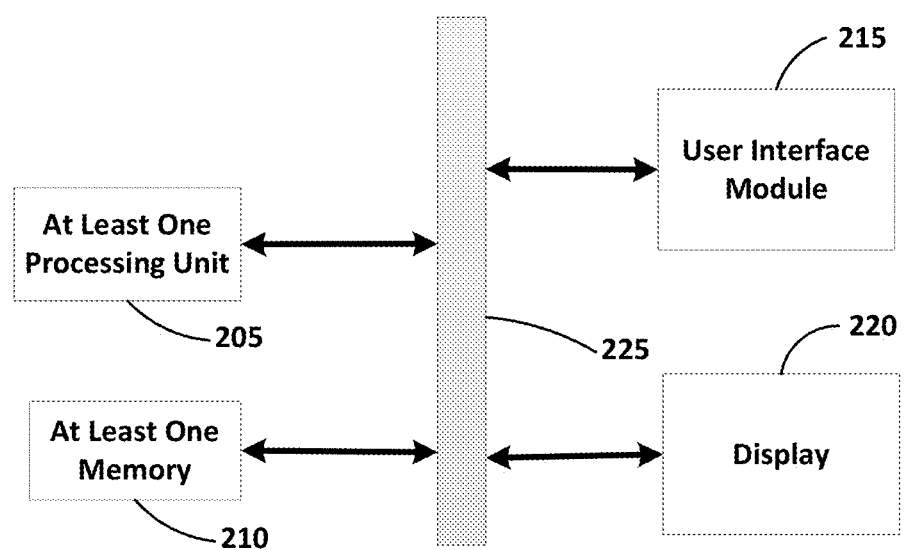
FIG. 2 illustrates a block diagram of an apparatus according to at least one example embodiment.

FIG. 2 illustrates a block diagram of an apparatus according to at least one example embodiment. As shown in FIG. 2, the apparatus 200 includes at least one processing unit 205, at least one memory 210, a user interface module 215, and a display 220. The at least one processing unit 205, the at least one memory 210, the user interface module 215 and the display 220 are communicatively coupled via bus 225. The apparatus 200 may be, for example, a software module or an integrated circuit (e.g., application-specific integrated circuit).

In the example of FIG. 2, the apparatus 200 may be at least one computing device and should be understood to represent virtually any computing device configured to perform the methods described herein. As such, the apparatus 200 may be understood to include various standard components which may be utilized to implement the techniques described herein, or different or future versions thereof. By way of example, the apparatus 200 is illustrated as including the at least one processing unit 205, as well as at least one memory 210 (e.g., a computer readable storage medium).

Thus, as may be appreciated, the at least one processing unit 205 may be utilized to execute instructions stored on the at least one memory 210, so as to thereby implement the various features and functions described herein, or additional or alternative features and functions. Of course, the at least one processing unit 205 and the at least one memory 210 may be utilized for various other purposes. In particular, it may be appreciated that the at least one memory 210 may be understood to represent an example of various types of memory and related hardware and software which might be used to implement any one of the modules described herein. Systems and/or methods described below may include data and/or storage elements. The data and/or storage elements (e.g., tables) may be stored in, for example, the at least one memory 210.

The user interface module 215 may be configured to generate a user interface based on a user interface template and configurations defined by states of state machines. The user interface module 215 may store data and code that when executed by the at least one processing unit 205 performs the functions associated with the user interface module 215. The user interface module 215 may be a standalone hardware module including a processor (not shown) configured to perform the associated functions. Further descriptions of the functions of the user interface module 215 are described below.

The display 220 may be configured to display the user interface. The display 220 may be, for example, a TFT LCD (Thin-Film-Transistor Liquid Crystal Display) or an OLED (Organic Light Emitting Diode) display, or other appropriate display technology.

Although apparatus 200 is shown as a device that generates and displays the user interface, example embodiments are not limited thereto. For example, the apparatus may be a computing device that includes a stand-alone compiled (e.g., executable) software system including the user interface. For example, the system may include executable code including the user interface module 215. However, apparatus 200 may be a server configured to generate interpreted code (e.g., HTML) for display on another computer device as, for example, a web page. Further, apparatus 200 may be a client configured to receive interpreted code. Receiving the interpreted code may include receiving code to be interpreted, at least in part, as the user interface module 215.

Figures 3A, 3B, 3C:
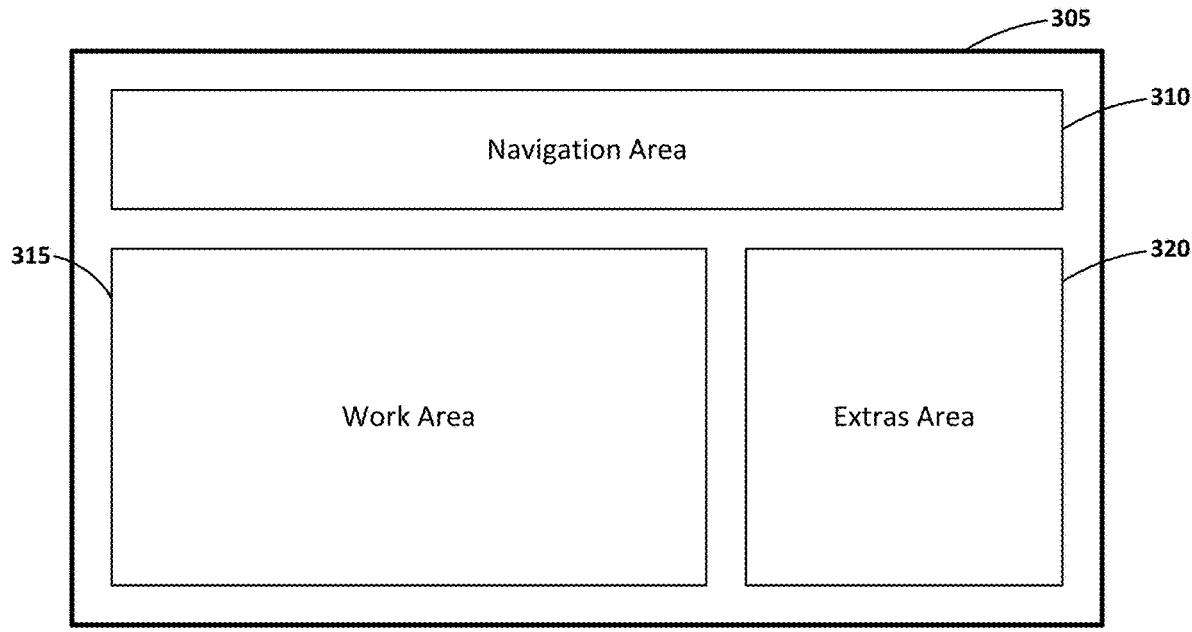
FIGS. 3A-C illustrate a user interface template and tables for configuring a user interface according to at least one example embodiment.

FIGS. 3A-C illustrate a user interface template and tables for configuring a user interface (utilizing the user interface template) according to at least one example embodiment. As shown in FIG. 3A, the user interface template 305 includes a navigation area 310, a work area 315, and an extras area 320. Although the user interface template 305 is shown as including the navigation area 310, the work area 315, and the extras area 320, example embodiments are not limited thereto. The user interface template 305 may include any number of areas as needed to perform the function of the associated user interface.

Each area (e.g., the navigation area 310, the work area 315, and the extras area 320) may include one or more components. For example, the table 325 shown in FIG. 3B illustrates a relationship between areas and components in the case where there is a single state machine in effect. For example, the table 325 shown in FIG. 3B includes headings area 335 and component 340. The data of the table 325 shown in FIG. 3B shows that a component named "Navigator" is associated with the navigation area 310. Further, components named "Diagram 1", "Diagram 2", and "Graph 1" are associated with the work area 315. Still further, a component named "Photo" is associated with the extras area 320. Although the user interface template 305 is shown as having the associations of the table 325 shown in FIG. 3B, example embodiments are not limited thereto.

In addition to the relationship between areas and components, the table 325 associates configurations with a state. For example, the table 325 includes a header state name 330. The data of the table 325 shows that a "Default" state is associated with the component named "Navigator" which is shown in the navigation area 310. The data of the table 325 shows that a "State 1" state is associated with the components named "Diagram 1" and "Photo" which are shown in the work area 315 and the extras area 320 respectively. The data of the table 325 shows that a "State 2" state is associated with the components named "Diagram 2", "Graph 1" and "Photo" which are shown in the work area 315 and the extras area 320 respectively.

In addition to the relationship between areas, components and states, the table 325 shown in FIG. 3B associates properties with the component. For example, the table 325 includes a header properties 345. Properties may represent some initial configuration data that a component may require at initialization time. This is enough to allow a run-time system to instantiate the desired components in the specified page areas. Properties may be, for example, inputs to a function, display parameters (e.g., on or off), and/or characteristics of an element (e.g., color or text size), and/or the like. Therefore, the table 325 may include properties associated with component. For example, component "Navigator" may have a property "P1", the property may include one or more settings (e.g., "A" and "B"). For example, property "P1" may be associated with whether or not to display the Navigator. Setting "A" associated with the property may be "Yes" or "No" and setting "B" associated with the property may be a setting for how long to show the Navigator (e.g., always or for 10 seconds).

Further, the table 355 as shown in FIG. 3C extends the functionality of states by grouping some states together to form multiple, independent state machines. Grouping states may simplify development of the user interface by, for example, allowing a user interface developer to focus on configurations that may only be allowed in certain scenarios. For example, if a graph (a diagram or a photo) is selected as a display mechanism, a state group (e.g., a separate state machine that has its own name and is designed to be used to manage certain areas of the template) may include components associated with a graph (diagram or a photo) and exclude components that are not associated with a graph (diagram or photo). The table 355 includes the elements of the table 325 shown in FIG. 3B and adds a header "State Group" 360. The data of the table 355 shows that a state group "Static" is associated with the "Default" state and a state group "Dynamic" is associated with "State 1" and "State 2" respectively. For example, as discussed above, the plurality of areas may display static and/or dynamic user interface elements (e.g., components). The components associated with the default state may be static (or semi-static) and the components associated with state 1 and/or state 2 may be dynamic.

Figures 4A, 4B:
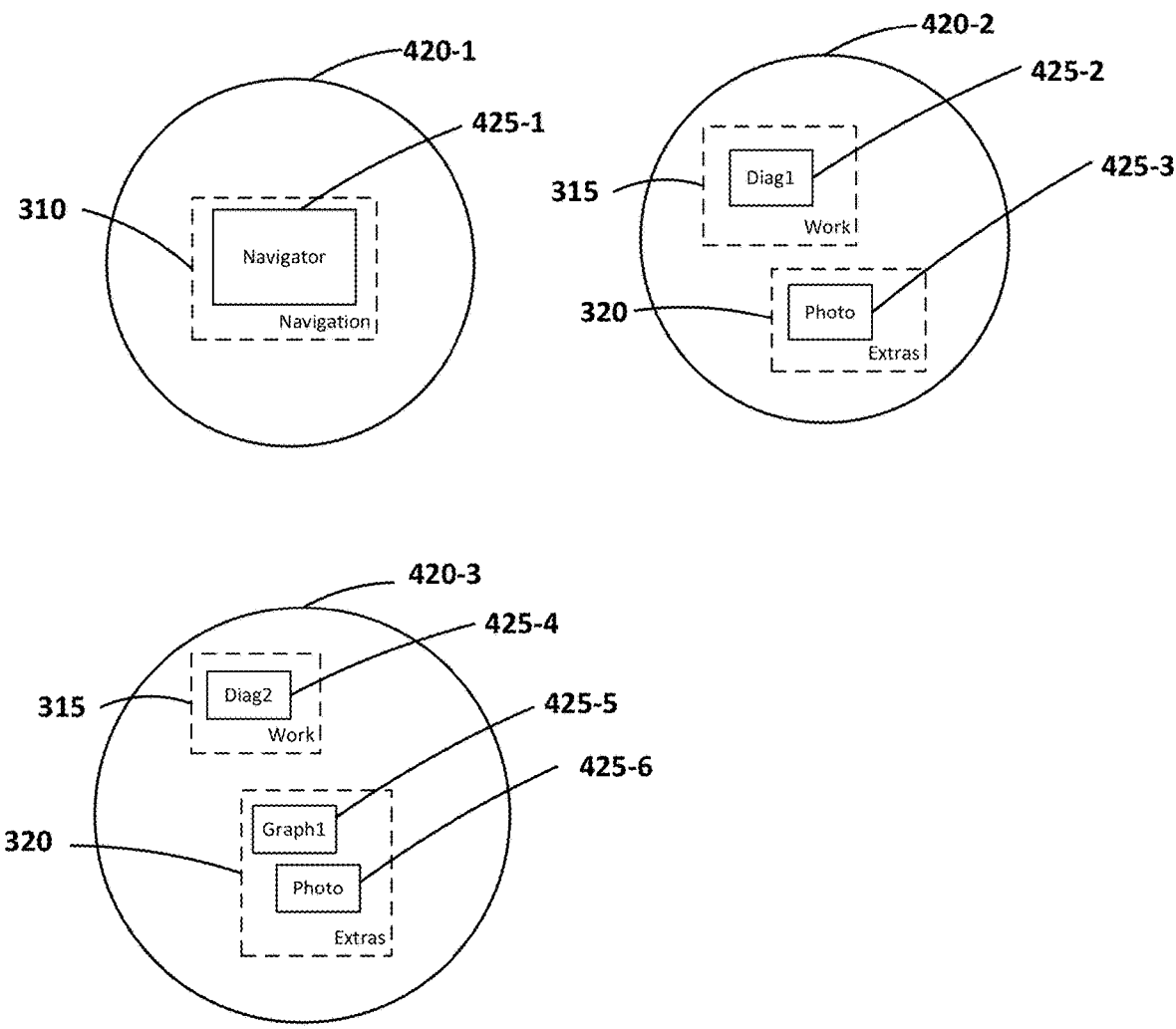
FIGS. 4A and 4B illustrate user interface states and a table for configuring a user interface using the user interface states according to at least one example embodiment.

FIGS. 4A and 4B illustrate user interface states and a table for configuring a user interface using the states (as user interface states) according to at least one example embodiment. As shown in FIG. 4A there may be three states 420-1, 420-2, and 420-3. Although three states are shown, example embodiments are not limited thereto. Each of the states maps at least one component 425-1 to 425-6 to at least one interface area 310, 315, 320 (noting that the relationship between states, areas and components is not one of containment or ownership).

Each of the states 420-1, 420-2, and 420-3 may be independent of each other. The independence of both the states 420-1, 420-2, and 420-3 and the components 425-1 to 425-6 may allow development of the components 425-1 to 425-6 to be independent of an end use user interface and/or allow reuse of components 425-1 to 425-6 for user interfaces that were not considered at the time of development of the components 425-1 to 425-6.

Each of the at least one component 425-1 to 425-6 may include (but do not necessarily include) at least on input and/or output event. Each of the at least one component 425-1 to 425-6 may include (but do not necessarily include) at least one input and/or output event data. In order to be useful, the components (and states) may have a mechanism to interact with each other. For example, the mechanism may include publishing, and subscribing to, events. For example, table 440 of FIG. 4B illustrates a relationship between a component (e.g., the at least one component 425-1 to 425-6) and published events and event data as well as a relationship between a component and subscribed to events and event data.

As shown in FIG. 4B "component header" 445, a "published event" header 450, a "published event data" header 455, a "subscribed to event" header 460, and a "subscribed to event data" header 465 may be columns of table 440. Each row of data in table 440 may describe the aforementioned relationships. For example, the navigator (e.g., component 425-1) may include a published event (output) of item selected which may include some form of item data. In addition, the navigator (e.g., component 425-1) may include a subscribed to event (input) of navigator display which may include some form of Boolean input data.

The states 420-1, 420-2, and 420-3 may have at least one associated component 425-1 to 425-6. The association may be described in a table. For example, table 325 and/or table 355 as described above with regards to FIGS. 3B and 3C, respectively, may describe the association between the states 420-1, 420-2, and 420-3 may have the at least one associated component 425-1 to 425-6.

In example embodiments, components may have been implemented such that each component is aware of each other's events. However, this awareness creates a situation where the two components may necessarily be designed together (or with knowledge of each other), and in many cases, deployed together. However, according to other example embodiments, developers of the components may not be aware of each others' component implementation. The components may be created by different teams with different software lifecycles. Therefore, components may not respond directly to other component events. In addition, components may not have any idea about the page template the components are deployed in, or about the page states that allow components to interact.

Therefore, a configuration-driven technique called event orchestration may be utilized. FIGS. 5A and 5B illustrate user interface states and a table for configuring a user interface using the user interface states (or event orchestration) according to at least one example embodiment. FIG. 5A shows six states 515-1 to 515-6. As described above, states may be grouped. As such, FIG. 5A also shows three state groups 505, 510, and 520. State group 505 includes state 515-1 (Default), state group 510 includes state 515-2 (State 1) and state 515-3 (State 2) and state group 520 includes state 515-4 (PhotoView), state 515-5 (SpecificationView) and state 515-6 (GraphView). In state group 510 and state group 520, any one of the associated states may be a default state.

FIG. 5B illustrates an example table 530 describing the relationship between receiving (or detecting) an event and transitioning from a first state to a second state based on the received event. As shown in FIG. 5B headers "component" 535 and 552, a header "published event" 540, a header "conditional check" 545, a header "page state change" 550, a header "subscribed to event" 555, and a header "event data transformation" 560 may be columns of table 530. Each row of data in table 530 may describe a relationship between receiving an event and transitioning from a first state to a second state based on the received event. For example, the navigator item selected event may cause a conditional check of (published event data) item. If item="A", page state (e.g., user interface state) may change to state 1 (e.g., state 515-2). If item="B", page state (e.g., user interface state) may change to state 2 (e.g., state 515-3). Each of these transitions is shown in FIG. 5A as transition 502-1 and 502-2.

System start-up (e.g., an initial state) may include selection of a blank user interface template (e.g., user interface template 305) based on some configuration or request (e.g., webpage request). The user interface may generate a first configuration setting the initial state of each state group, e.g. "Default" state 515-1 for state group 505, "State 1" 515-2 for state group 510, and "PhotoView" 515-4 for state group 520.

Further, one event may cause action on more than one state as is shown in the third row of table 530.

Still further, table 530 may orchestrate a reaction to an event that is different to or in addition to the subscribed event (e.g., republish an event) of a component. For example, assume diagram1.nodeselected is programmed to cause the font of a row in a diagram to bold. According to example embodiments, as is illustrated in table 530, the user interface may also display a photo by a transition to state="PhotoView". In addition, the orchestration may be that nothing happens even though the component would normally cause a reaction of the user interface. In this way a designer of the user interface may vary the functionality of the user interface by using events in a different manner than intended by the designer of a component.

Figure 6:
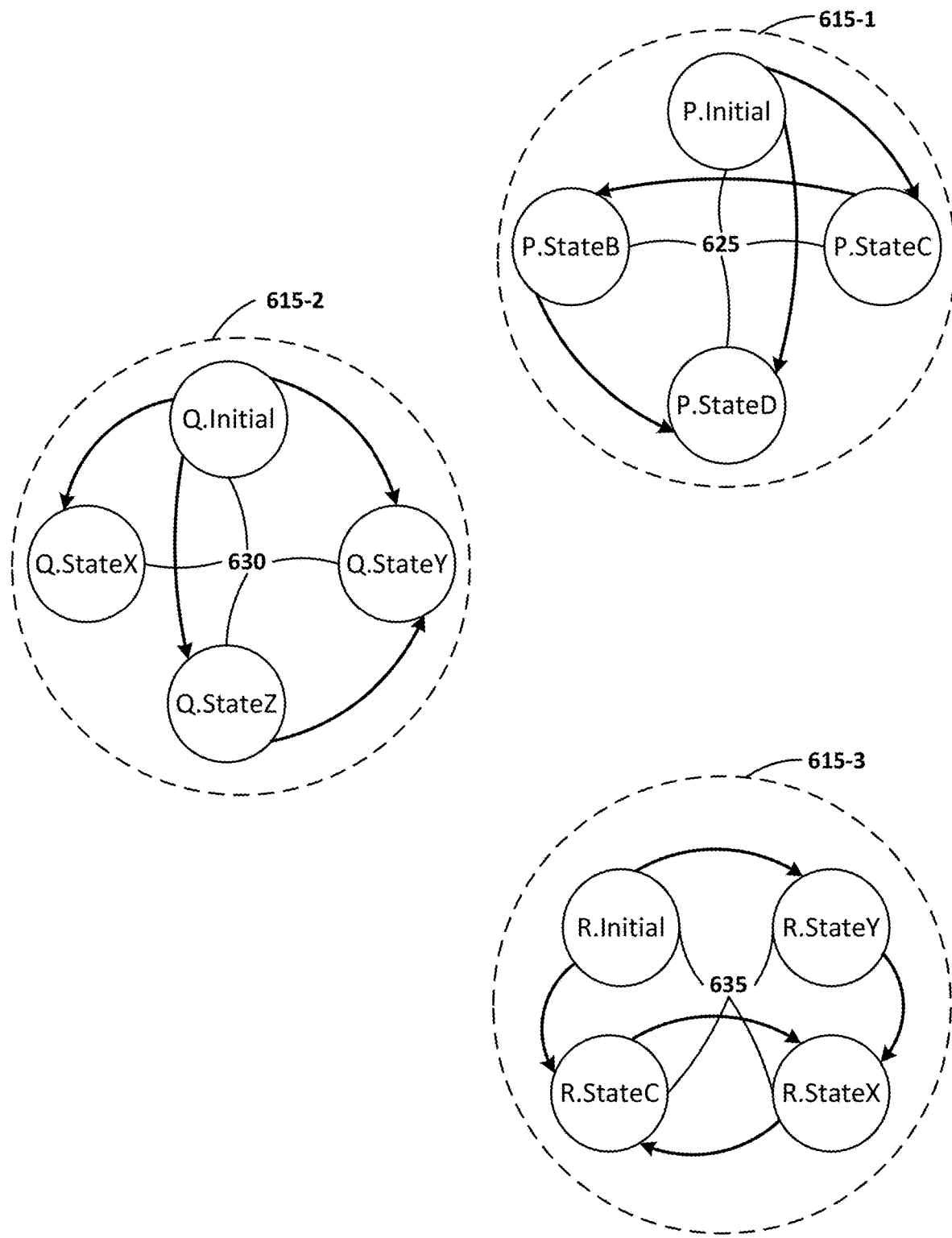
FIG. 6 illustrates user interface state groups according to at least one example embodiment.

FIG. 6 illustrates user interface state groups (also referred to as state machines) according to at least one example embodiment. As shown in FIG. 6, the user interface state groups 615-1, 615-2 and 615-3 each include at least one state 625, 630, 635. The states 620, 625, 630, 635, their associated components and the transitions there between may be similar to those described above (e.g., state 420-1, 420-2 and 420-3) and will not be described here for the sake of brevity. However, it is worth noting that in each state group 615-1, 615-2 and 615-3 has one current state at any given time.

As discussed above, a state group manages a set of (one or more) user interface areas. Each state group may include an "Initial State" and a "Current State". For example, at any given point in time, any one the states 625, 630, 635 may be the "Current State" for the corresponding state group 615-1, 615-2 and 615-3.

Figure 7:
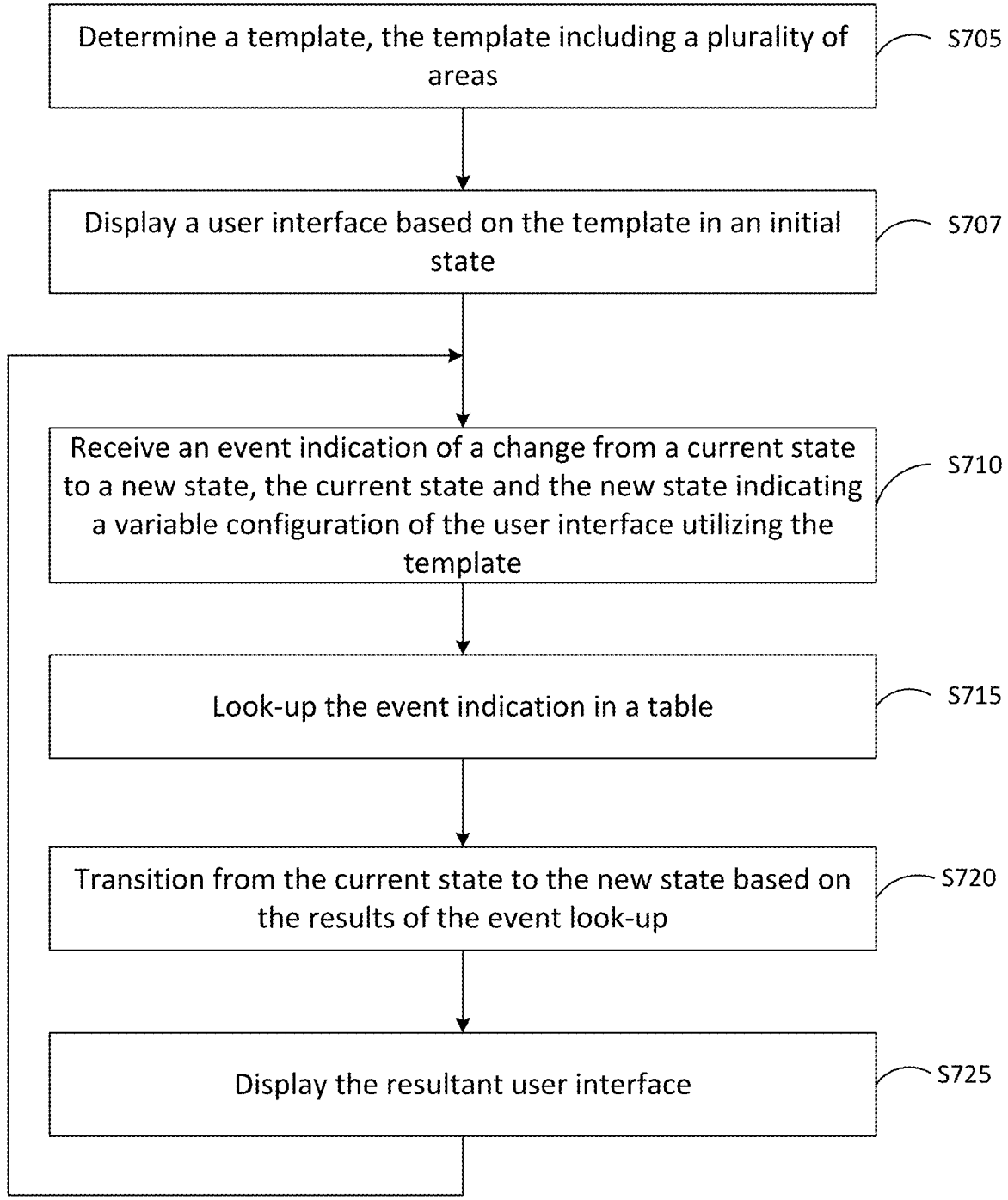
FIG. 7 illustrates a method for generating a user interface according to at least one example embodiment.

FIG. 7 illustrates a method for generating a user interface according to an example embodiment. The method steps described with regard to FIG. 7 may be executed as software code stored in a memory (e.g., at least one memory 210) associated with a system (e.g., as shown in FIG. 2) and executed by at least one processor (e.g., at least one processor 205) associated with the system. For example, the processor may be associated with one or more of the blocks (e.g., the user interface module 215) or the apparatus 200. However, alternative embodiments are contemplated such as a system embodied as a special purpose processor.

For example, the method steps may be performed by an application-specific integrated circuit, or ASIC. For example, the ASIC may be configured as one or more of the blocks (e.g., the user interface module 215) and/or the apparatus 200. Although the steps described below are described as being executed by a processor, the steps are not necessarily executed by a same processor. In other words, at least one processor may execute the steps described below with regard to FIG. 7.

As shown in FIG. 7, in step S705 a processor (e.g., at least one processing unit 205) determines a template for use in a user interface. The template includes a plurality of areas. For example, if the user interface is an element of a stand alone or compiled program, the processor may read a configuration file on the computer executing the program including the user interface. If the user interface is an element of an interpreted (e.g., HTML) program, the user interface may be based on a requested page and/or a configuration file. For example, the processor may read a configuration file to determine the template to use for the user interface. In step S707, the user interface is displayed in an initial state (e.g., the initial state of each state group upon start-up, such as states 515-1, 515-2, 515-4).

In step S710 the processor receives an event indication of a change from a current state (e.g., an initial state if performing a first transition) to a new state. For example, while in the current state, a user of the user interface may interact with the user interface in such a way to generate the event. For example, a non-user activity (e.g., a timer expiration) event may occur as the event. The current state and the new state indicate a variable configuration of the user interface utilizing the template. For example, as described above, a state (e.g., state 420-1, 420-2 and 420-3) may have associated components. Each component may have associated input and output events. For example the associated components may subscribe to and publish events as described above with regards to FIGS. 4A and 4B.

In step S715 the processor looks-up the event indication in a table. For example, the table may describe the relationship between receiving an event and transitioning from a current state to a new state. The processor may use the table (e.g., table 530) to look-up the event. The processor may then choose a state group (e.g., static 505 or dynamic 510) and an associated state (e.g., 515-1 to 515-6) based on the results of the look-up. For example, the processor may choose "State 1" (e.g., state 515-2) if the event is a navigator item selected event and the item selected="A" (as shown in table 530).

In step S720 the processor transitions from the current state to the new state based on the results of the event look-up. For example, as shown in FIG. 5A, the processor may transition from state 1 to state 2. A shown in FIGS. 3A and 3B, "State 2" may include a photo component displayed in the extras area. The transition may include selecting a new photo based on a lookup of a variable (e.g., PhotoID).

In step S725 the processor displays the resultant user interface. For example, if the user interface is an element of a stand alone or compiled program, the processor may display template with the determined state and the configured components. If the user interface is an element of an interpreted (e.g., HTML) program, the user interface may be communicated from a server to a client device.

In a web page (e.g., interpreted) implementation, state change request may be the result of user interaction on a client device. For example, a user may click on a button or a picture causing a request to a server. However according to example embodiments, components may be served to the client device as part of an earlier (e.g., initial) request. Therefore, states, components and/or data may be stored on the client computer (e.g., as code, as a table and/or as picture). As a result, a state change request may not result in a server request and instead may be processed by the client computer.

Further, example embodiments may be modified such that states, components and/or data may be communicated by the server to the client if the states, components and/or data are navigable from a current state. For example, if the current state can transition to "State 1" or "State 2", "State 1" and "State 2" (as well as associated components and/or data) may be communicated to the client computer. However, "State 3" which may be navigable from "State 2" may not be communicated. If, in the future, a transition to "State 2" occurs, "State 3" (as well as associated components and/or data) may be communicated to the client computer. "State 3" (as well as associated components and/or data) may be communicated to the client computer in a background process.

Figure 8:
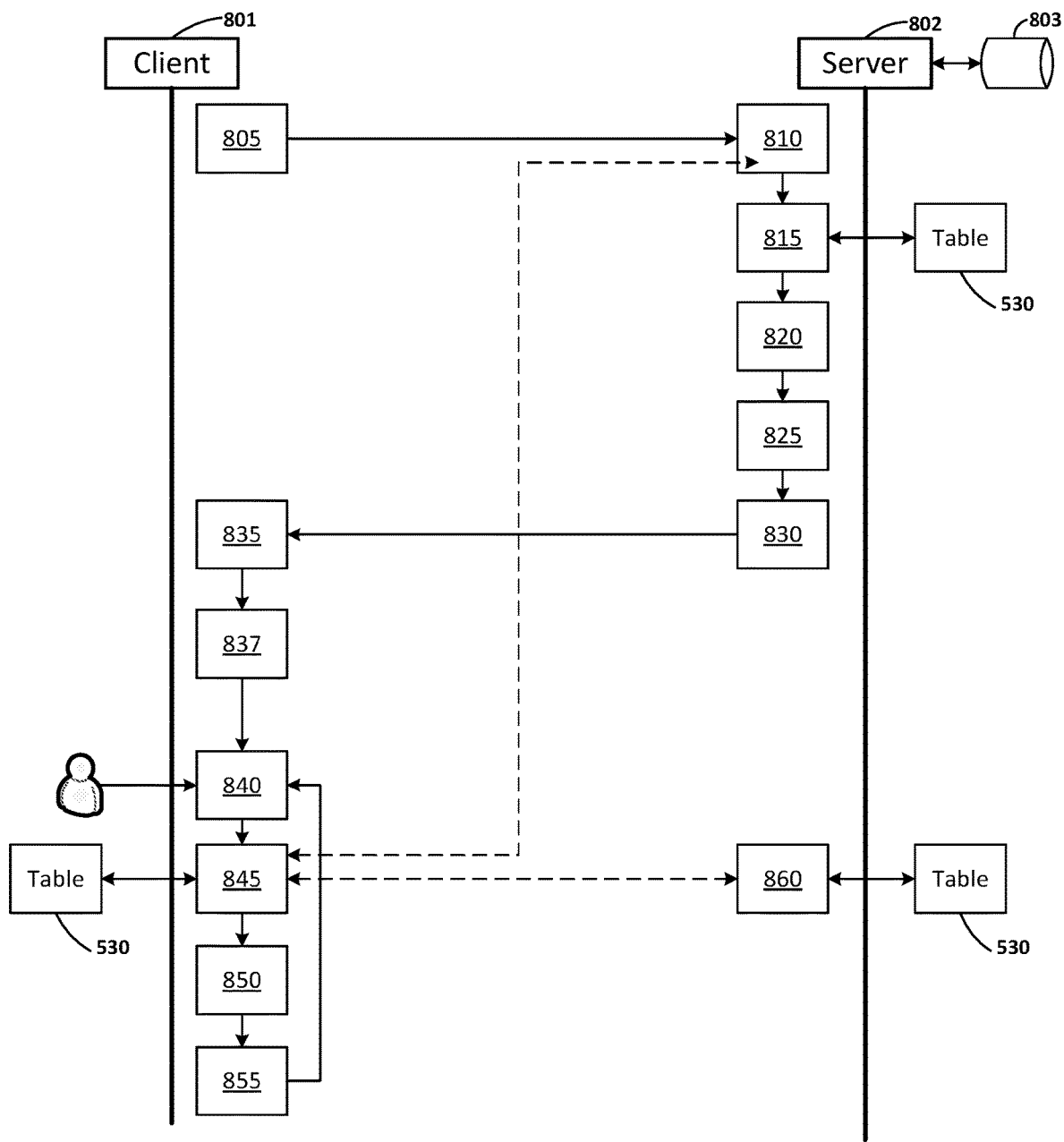
FIG. 8 illustrates another method for generating a user interface according to at least one example embodiment.

FIG. 8 illustrates signal flow diagram for generating a user interface for a client computer according to at least one example embodiment. The blocks described with regard to FIG. 8 may be executed as software code stored in a memory (e.g., at least one memory 210) associated with a system (e.g., as shown in FIG. 2) and executed by at least one processor (e.g., at least one processor 205) associated with the system. For example, the processor may be associated with one or more of the blocks (e.g., the user interface module 215) or the apparatus 200. However, alternative embodiments are contemplated such as a system embodied as a special purpose processor.

For example, the blocks may be performed by an application-specific integrated circuit, or ASIC. For example, the ASIC may be configured as one or more of the blocks (e.g., the user interface module 215) and/or the apparatus 200. Although the blocks described below are described as being executed by a processor, the blocks are not necessarily executed by a same processor. In other words, at least one processor may execute the blocks described below with regard to FIG. 8.

As shown in FIG. 8, a client 801 and a server 802 may operate together to generate a user interface for display on the client 801. The client 801 and the server may be communicatively coupled via, for example, the internet. Further, the server 802 may be communicatively coupled with a data source 803. The data source may store data (e.g., photos, configurations) for use by the server 802 as necessary.

As shown in FIG. 8, in block 805 the client communicates a request for a web page, the web page including a user interface. For example, the client 801 may send a page request to the server 802 which may be configured to generate web pages including the user interface (as described above) using an internet browsing standard. In block 810 the server 802 receives the request for the web page, the web page including a user interface.

In block 815 the server 802 determines a template for the user interface. For example, the request may include information about the user interface. The template may be determined based on the information. For example, the template may be determined based on a configuration file and the information.

In block 820 the server 802 generates a first state for the user interface based on the received request. For example, if the received request is an initial request, the first state may be an initial state or a first state transitioned from an initial state. Alternatively, the request may be a second or subsequent request. Therefore, the request may include additional information about a current state associated with the user interface and an event. The first state may be determined based on the event. The first state may be determined based on the event and the current state.

In block 825 the server 802 generates the user interface based on the first state. For example, as discussed above, the user interface may include states having associated components in a variable configuration. The processor may generate the user interface such that the associated components are configured based on the first state.

In block 830 the server 802 communicates a response to the request, the response including the web page, the user interface and other information configured to support the user interface. For example, the response may be an HTML document including the user interface for display on the client device. The other information may include, for example, states, components and/or data to be stored on the client computer.

In block 835 the client 801 receives the response to the request, the response including the web page, the user interface and other information configured to support the user interface. For example, the web page may be may be an HTML document including the user interface for display on the client device. The other information may include, for example, states, components and/or data to be stored on apparatus 200 (as a client device). The processor may display the web page (including the user interface on a display (e.g., display 220). In block 837, the client 801 displays the web page. For example, the client may display the web page as the user interface in a first state (e.g., an initial state).

In block 840 the client 801 receives an event indication of a change from a current state (noting that the current state may be an initial or first state) to a new state, the current state and the new state indicating a variable configuration of the user interface. For example, while in the current state, a user of the user interface may interact with the user interface in such a way to generate the event. For example, a non-user activity (e.g., a timer expiration) event may occur as the event. The current state and the new state may indicate a variable configuration of the user interface utilizing the template. For example, as described above, a state (e.g., state 420-1, 420-2 and 420-3) may have associated components. Each component may have associated input and output events. For example the associated components may subscribe to and published events as described above with regards to FIGS. 4A and 4B.

In block 845 the client 801 looks-up the event indication in a table. For example, the table may describe the relationship between receiving an event and transitioning from a first state to a second state. The processor may use the table (e.g., table 530) to look-up the event. The client 801 may then choose a state (e.g., state 420-2 or 515-1 to 515-6) based on the results of the look-up. For example, the client 801 may choose "State 1" (e.g., state 515-2) if the event is a navigator item selected event and the item selected="A" (as shown in table 530).

If the client 801 does not include information associated with the new state (e.g., states, components and/or data), the processor may request the information from the server 802. In block 860, the server 802 may communicate with the client 801 in order to provide additional information (e.g., state information, components, and/or data) to the client 801. Alternatively, processing may return to block 810, where the request may include information about the event, the current state, and/or the new state. This return request may be an additional web page request causing the server 802 to generate a web page including the user interface as previously discussed. However, information is communicated to the server 802 so that the server can determine the current state of the user interface as displayed on the client 801.

Further, block 860 may be configured such that the server 802 may be in constant (or relatively constant) communication with the client in order to communicate elements (e.g., states, components and/or data) in the background such that state transitions will not need additional information from the server 802 and thus occur almost instantly.

In block 850 the client 801 transitions from the current state to the new state based on the results of the event look-up. For example, as shown in FIG. 5A, the processor may transition from "State 1" to "State 2". A shown in FIGS. 3A and 3B, "State 2" may include a photo component displayed in the extras area. The transition may include selecting a new photo based on a lookup of a variable (e.g., PhotoID).

In block 855 the processor updates the web page based on the new state. For example, the processor may generate new code (e.g., HTML or script) representing the web page. The processor may interpret the new code and display the result.

According to example embodiments, building user interfaces may be distributed amongst several functional groups. For example, a "page template developer" may create a template that defines well-known page areas to support a particular user interface pattern. A "User Interface Component developer" may create user interface component definitions. A "Page designer" may create (1) page state configurations to map user interface components into page areas, managed by state groups whose states map into those areas; (2) event orchestration configurations to specify event transformation to bind user interface components to each other in a loosely-coupled fashion; and page state transitions. As a result, a customer can modify the application by acting as a "Page designer", without knowledge of blocks template developing and user interface component development by (1) adding a page state that includes different mappings of components to areas and (2) specifying the correct event orchestration so the components can interact correctly.

Example Implementation

In an example web page designed to allow interaction with a dynamic organization chart. The example web page may support two different layouts (or "states"). The user interface may toggle between these layouts without requiring an round-trip to re-build a new page. For example, the web page may include a user interface with two views. The first view may be an organization view which may include a hierarchical diagram (e.g., displayed in the work area of the template 305) with a photo of a selected employee on the side (e.g., displayed in the extra area of the template 305). The second view may be an employee view which may include employee details from a directory (e.g., displayed in the work area of the template 305), with a map showing the address and photo on the side (e.g., displayed in the extra area of the template 305). Toggling between the two views may be accomplished utilizing a navigation banner (e.g., displayed in the navigation area of the template 305).

The interactivity requirements of the user interface may be (1) the user toggles the view by means of the buttons on the top; (2) when an employee is selected from the org chart, show the employee's photo; (3) when an employee is "double-clicked" (sometimes called "drill down"), switch the view to Employee View; and (4) whenever an employee's details are shown, update the photo and map appropriately.

The user interface developer may utilize a common page template (e.g., template 305) that is used across the different dynamic use cases. This gives a measure of consistency to the experience, as well as allowing the dynamic behavior to be configuration driven. The user interface developer may utilize different individual components to accomplish the interactivity requirements. For example, the individual components may include a navigator component, a diagram component, an employee form component, a photo viewer component, and a map viewer component.

Having separated the components from the layout, the two views may be described as two different Page States using a declarative configuration. A Page State may be a mapping of components into Page Areas. Note that Page Areas can have multiple components mapped into them. Utilizing the table structure described above with regard to 3B, the page state may be as follows in Table 1:

TABLE 1

| State Group | State Name | Area | Component | Properties |
|---|---|---|---|---|
| Static | Default | Navigation | Navigator | Items: Organization, Employee |
| Dynamic | OrgView | Work | Diagram | Data: CorporateDirectory |
|  |  | Extras | Photo |  |
|  | EmployeeView | Work | EmployeeForm |  |
|  |  | Extras | Photo |  |

As discussed above, the States can be partitioned into State Groups. This effectively creates multiple state machines on the page, so that changing the component mapping in areas tied to certain events may be specified without interfering with areas managed by other events. In other words, State Groups allow the page designer to avoid having to specify a large number of permutations as discrete states, and the resulting page state transitions are more maintainable.

For the organizational chart, assume that each component is programmed to work with events using procedural logic within the component implementation, summarized as follows in table 2. Table 2 describes the information that the page developer would need to know in order to design the interaction. Table 2 may be formatted as described above with regard to FIG. 4B.

TABLE 2

| Component | Publishes | Published Event Data | Subscribes To | Subscribed Event Data |
|---|---|---|---|---|
| Navigator | ItemSelected | Item | | |
| Diagram | | Item | | |
| Diagram | NodeDrillDown | ItemID | | |
| Photo | | | DisplayRequest | Employee ID |
| EmployeeForm | | | Employee Changed | Employee ID |
| EmployeeForm | ContactRequest | EmployeeID | | |
| Map | | | MapRequest | Address |

In example embodiments components may have been implemented in a way that each component knows about each other's events. For example, the Photo component may have been programmed to respond to the Diagram's NodeSelected event directly. However, this creates a situation where the two components may necessarily be designed together (or with knowledge of each other), and in many cases, deployed together. However, according to example embodiments, developers of the components may not know about each others' component implementation (in software engineering this is commonly referred to as "loose coupling"). The components could in fact be created by different teams with different software lifecycles. Therefore, components may not respond directly to other component events. In addition, components may not have any idea about the page template the components are deployed in, or about the page states that allow components to interact.

Therefore, as described above, a configuration-driven technique called event orchestration may be utilized. Note that because of the existence of State Groups, the state machine describing the navigator area may be unaffected and may not need to be specified. Table 3 describes the event orchestration. Table 3 may be formatted as described above with regard to FIG. 5B.

in response to the defined events in each case. In this example, this is represented by a static navigator control (e.g., state group 505), but in practice, a page can have many "moving parts" with a simple declarative syntax for describing independent state changes. For example, the extras area of template 305 could have been represented by a separate state group.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For

TABLE 3

| Incoming Event | Conditional Check | Page State Change | Outgoing Event | Event Data Transform |
|---|---|---|---|---|
| Navigator. ItemSelected | Item = "Organization" | Dynamic. OrgView | | |
| Navigator. ItemSelected | Item = "Employee" | Dynamic. EmployeeView | | |
| Diagram. NodeSelected | — | — | Photo. DisplayRequest | Employee. lookup(ItemID) |
| Diagram. NodeDrillDown | — | Dynamic. EmployeeView | EmployeeForm. EmployeeChanged | Employee. lookup(ItemID) |

The state transition diagram may be similar to the diagram shown in FIG. 5A with Organization view replacing state 1 520 and Employee view replacing state 2 525. The use of State Groups may create two independent state machines. This may reduce the complexity of dynamic pages, because only the changes to the relevant areas need to be configured example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

We claim:

1. A method of displaying a user interface on a client device, the user interface being based on one or more user interface templates, the method comprising, transmitting, from a server to the client device, a first plurality of components and a second plurality of components for display in a first display area and a second display area, respectively, of the user interface;

transmitting a first plurality of states of the user interface from the server to the client device, each state of the first plurality of states associated with a respective mapping of at least one of the first plurality of components to the first display area, and of at least one of the second plurality of components to the second display area;

transmitting, from the server to the client device, and based on a first state table stored at the server, a first state change among the first plurality of states, the first state change occurring in response to a first input event and a first output event at a first component of the first plurality of components causing a second input event at a second component of the second plurality of components, and thereby to an execution of at least one user interface function by the second component;

determining, at the server, a second plurality of states of the user interface and a second state table specifying a second state change among the second plurality of states, each state of the second plurality of states associated with a respective mapping of at least one of the first plurality of components to the first display area, and of at least one of the second plurality of components to the second display area; and transmitting the second plurality of states and the second state change, as determined from the second state table, from the server to the client device, in response to the execution of the at least one user interface function by the second component and prior to an input event at either the first plurality of components or the second plurality of components that would cause the second state change.

2. The method of claim 1, further comprising:

transmitting a third plurality of components for display in a third display area of the user interface, the first state table including a third state change that updates a mapping of the third plurality of components with respect to the third display area, wherein the first state change occurs independently of the third state change.

3. The method of claim 1, wherein user interface data required to implement the at least one user interface function is transmitted prior to receipt of the first input event.

4. The method of claim 1, wherein one or more of the first plurality of components and the second plurality of components includes a property, the property being at least one of representing initial configuration data required at initialization and representing configuration data for a state change.

5. The method of claim 1, wherein the first state table includes an incoming event received from one of the components in relation to a state change based on a conditional check.

6. The method of claim 1, wherein each of the first plurality of components and the second plurality of components is defined independently.

7. The method of claim 1, wherein each of the first plurality of states and the second plurality of states is defined independently.

8. The method of claim 1, wherein the user interface is associated with either an executable compiled software or an interpreted software.

9. A server, comprising:
at least one processor, and
at least one non-transitory computer readable memory storing code segments that when executed by the processor cause the processor to,
receive a request for a webpage from a client computing device, the webpage including a user interface, the user interface being based on one or more user interface templates;
transmit, from a server to the client computing device, a first plurality of components and a second plurality of components for display in a first display area and a second display area, respectively, of the user interface;
transmit a first plurality of states of the user interface from the server to the client computing device, each state of the first plurality of states associated with a respective mapping of at least one of the first plurality of components to the first display area, and of at least one of the second plurality of components to the second display area;
transmit, from the server to the client device, and based on a first state table stored at the server, a first state change among the first plurality of states, the first state change occurring in response to a first input event and a first output event at a first component of the first plurality of components causing a second input event at a second component of the second plurality of components, and thereby to an execution of at least one user interface function by the second component;
determine, at the server, a second plurality of states of the user interface and a second state table specifying a second state change among the second plurality of states, each state of the second plurality of states associated with a respective mapping of at least one of the first plurality of components to the first display area, and of at least one of the second plurality of components to the second display area; and
transmit the second plurality of states and the second state change, as determined from the second state table, from the server to the client device, in response to the execution of the at least one user interface function by the second component and prior to an input event at either the first plurality of components or the second plurality of components that would cause the second state change.

10. The server of claim 9, wherein
if the request is a first request for the webpage, the first plurality of states is based on an initial state of the user interface; and
if the request is not the first request, the first plurality of states is based on a current state of the user interface.

11. The server of claim 9, wherein the code segments, when executed by the processor, cause the processor to,
transmit a third plurality of components for display in a third display area of the user interface, the first state table including a third state change that updates a mapping of the third plurality of components with respect to the third display area,
wherein the first state change occurs independently of the third state change.

12. The server of claim 9, wherein user interface data required to implement the at least one user interface function is transmitted prior to receipt of the first input event.

13. A client device, comprising:
at least one processor, and
at least one non-transitory computer readable storing code segments that when executed by the processor cause the processor to,
communicate a request for a webpage, the webpage including a user interface, the user interface being based on one or more user interface templates; and
receive a first plurality of components and a second plurality of components for display in a first display area and a second display area, respectively, of the user interface;
receive a first plurality of states of the user interface, each state of the first plurality of states associated with a respective mapping of at least one of the first plurality of components to the first display area, and of at least one of the second plurality of components to the second display area;
access a first state table, the first state table specifying a first state change among the first plurality of states, the first state change occurring in response to a first input event and a first output event at a first component of the first plurality of components causing a second input event at a second component of the second plurality of components, and thereby to an execution of at least one user interface function by the second component; and
receive a second plurality of states of the user interface and access a second state table specifying a second state change among the second plurality of states, each state of the second plurality of states associated with a respective mapping of at least one of the first plurality of components to the first display area, and of at least one of the second plurality of components to the second display area, in response to the execution of the at least one user interface function by the second component and prior to an input event at either the first plurality of components or the second plurality of components that would cause the second state change.

14. The client device of claim 13, wherein the code segments, when executed by the processor, cause the processor to
transmit a third plurality of components for display in a third display area of the user interface, the first state table including a third state change that updates a mapping of the third plurality of components with respect to the third display area,
wherein the first state change occurs independently of the third state change.

15. The client device of claim 13, wherein user interface data required to implement the at least one user interface function is transmitted prior to receipt of the first input event.

* * * * *